Figure 1:
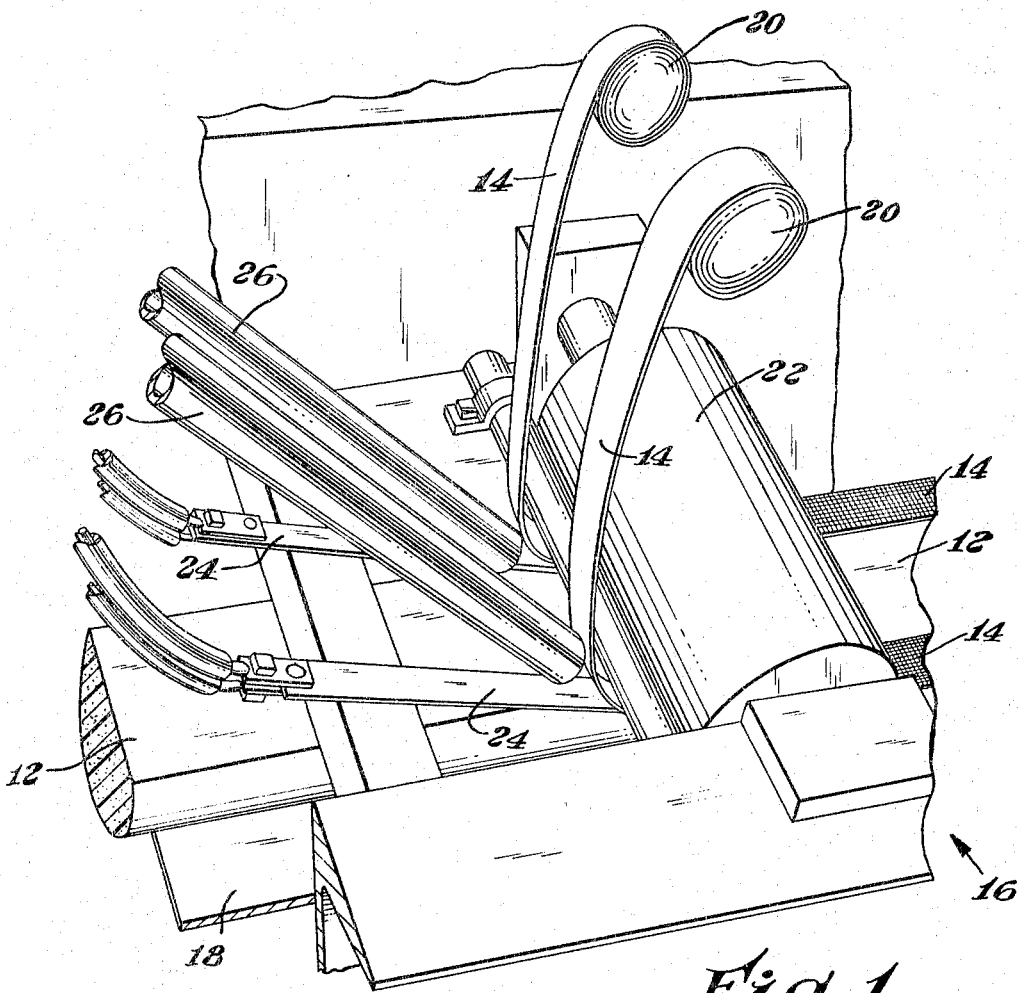

June 13, 1967 K. J. CLEEREMAN 3,325,332
METHOD FOR HEAT SEALING PLASTIC FILM TO PLASTIC FOAM
Filed Oct. 8, 1962

INVENTOR.
Kenneth J. Cleereman
BY
ATTORNEY

United States Patent Office 3,325,332
Patented June 13, 1967

3,325,332
METHOD FOR HEAT SEALING PLASTIC FILM TO PLASTIC FOAM
Kenneth J. Cleereman, Midland, Mich., assignor to The Dow Chemical Company, Midland, Mich., a corporation of Delaware
Filed Oct. 8, 1962, Ser. No. 228,874
6 Claims. (Cl. 156—322)

This invention relates generally to a method for laminating plastic film to compatible plastic foam and, more particularly, relates to a method whereby relatively thick webs of plastic film can be effectively heat sealed to plastic foam.

In the manufacture of many articles it is often desirable to unite plastic film to plastic foam such as, for example, where a piece of reinforcing strip of plastic film is attached to an edge of plastic foam such that the film can be used as a fastening strip in attaching the foam to a given article. Where the strip of film is relatively thin, there generally has been little difficulty in heat sealing the film to the foam by such simple processes as using a heated knife between the foam and the film. But such thin films lack the required strength in many applications and thicker films must often be employed. However, it has generally been impractical to similarly heat seal a thick film webbing to a foam surface. This is because the quantity of heat applied to a thick webbing to make it heat sealable is usually so great that the heat still retained in the webbing, after the sealing is effected, results in a destruction of the foam cells. The problem is even more difficult when it is desired to heat seal the webbing to the foam in a continuous process at a reasonable rate of speed.

Prior methods of heat sealing thick film webbing to foam have not been satisfactory. For example, when an infrared heat source is used on a thick webbing it is difficult to achieve a high surface temperature without softening the entire webbing. Another method was to laminate the webbing as it was being emitted from an extruder. However, in the latter method it was always necessary to quench the webbing immediately after laminating or otherwise the heat content of the webbing would blister and melt the foam.

Accordingly, it is an object of the present invention to provide an effective method for heat sealing heavy plastic film webbing to plastic foam.

It is an object of the present invention to provide a method for heat sealing of thick plastic film webbing to plastic foam without a resulting deterioration of the foam.

Still another object of the present invention is to provide a method for the effective heat sealing of relatively thick plastic film webbing to plastic foam, the method being adaptable to a continuous process running at a constant rate of speed.

A still further object of the present invention is to provide a method for the effective heat sealing of relatively thick plastic films to plastic foams wherein only the outer surface of the film is softened.

A still further object of the present invention is to provide a method for the effective heat sealing of plastic film to plastic foam wherein a quenching step is not necessary to prevent undesirable blistering or melting of the foam.

Briefly then, the present invention relates to a method wherein a thick webbing of a plastic film, such as polyethylene, can be heat sealed to compatible plastic foam, such as expanded polyethylene. Any materials which can be heat sealed together are considered to be compatible. This invention can be accomplished in a continuous simple manner which avoids blistering or melting of the foam.

The method comprises first softening the foam through the application of heat and preheating the webbing such that only its outer skin or surface is softened before it makes contacts with the foam. To achieve the proper preheating of the webbing, apparatus is used wherein a heated atmosphere is applied to the webbing for only such a period of time, before it contacts the foam, that substantial heat penetration of the webbing is prevented.

Figure 2:
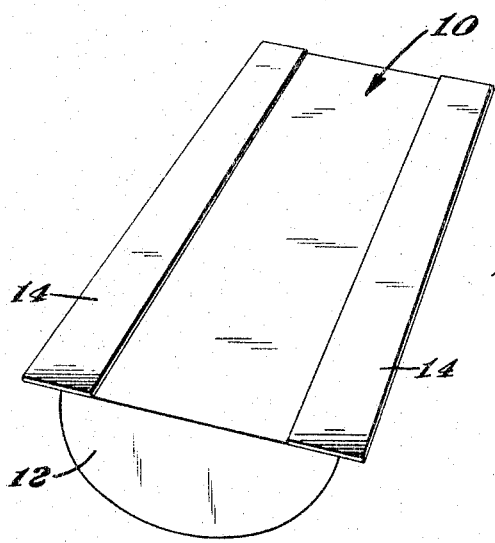

Yet additional objects and advantages of the present invention, and its numerous cognate benefits and features are even more apparent and manifest in and by the ensuing description and specification taken in conjunction with the accompanying drawing in which, wheresoever possible, like characters of reference designate corresponding material and parts throughout the several views thereof, in which:

FIGURE 1 is an isometric view of apparatus for heat sealing relatively thick plastic webbing to plastic foam; and FIGURE 2 is a isometric view of an article made by the apparatus and according to the method of the present invention.

Referring now to the drawing, there is illustrated a dock bumper 10 for boat docks or the like, the bumper comprising an elongated plastic foam body 12 of semi-circular cross section, having a thick plastic film webbing 14 of reinforced polyethylene heat sealed thereto, the film webbing providing a strip for attaching the bumper to the dock.

To attach the webbing to the foam, the body 12 of the bumper 10 is set into apparatus 16 along a bed 18, and fed into the apparatus in a continuous manner. Webbing 14 is introduced into apparatus 16 from reels 20 so as to mate with foam body 12 under a cooled roller 22 which, because of the latter's pressure, unites both strips of webbing 14 to foam body 12.

Resistance-heated blades 24, or other similar heat applicators, are attached to the apparatus 16 so that they soften the areas of the foam body 12 which mates with webbing 14 just prior to their engagement with that webbing under roller 22. Arranged so as to introduce a relatively large amount of heat on webbing 14 just prior to the aforementioned engagement thereof with the foam body 12, are heat applicators in the form of gas burners 26 which are preferably located so that their flame is introduced on the webbing as near as possible to the foam, but removed far enough from the foam so as not to be damaging thereto. In this preferred embodiment, a flame is directed so that it, or the hot gases generated by it, impinge along the webbing in the general same direction as the webbing travels. By so directing the flame or gases a greater area contact with the webbing can be had before it enters the nip formed by roller 22. It is also possible by changing the angle of the flame a few degrees, but still keeping it in the same general direction, to slightly increase or decrease the area of heating to increase or decrease, respectively, the amount of webbing softening. The burners speed up the rate of laminating by giving off intense heat. A different quantity of heat is needed to soften the webbing than to soften the foam body because of the much higher density of the webbing. Thus, while blades 24 are adequate to soften the surface of foam body 12, the heat they generate would be quite inadequate to soften webbing 14. Thus, as the heated webbing 14 engages the softened foam body 12, cooled roller 22 unites them under pressure and maintains the union by cooling the lamination as the roller exerts its pressure.

It has been found that in operation, excessive heat from burners 26 will cause a waviness in the webbing after it has been cooled; and, on the other hand, insufficient heat from the burners will result in a loose bond.

However, within certain ranges which vary for the particular materials involved, excellent lamination can occur. Once the proper conditions are established the thickness of the webbing or of the foam is immaterial as only softening of the surfaces of each is involved. In understanding this invention it is apparent that the rate of travel of the laminating elements determines the temperatures of the heating elements. For example, the heat from the burners must be great enough to soften the surface of the webbing a few mils, but not so great as to melt therethrough.

The following specific example provides excellent adhesion between a particular foam and a particular webbing. It is to be understood that this example is set forth for illustrative purposes only.

Polyethylene foam was conveyed at a rate of 11.6 feet per minute in apparatus similar to that illustrated in FIGURE 1. A resistance heater at a temperature of about 360° F. was used to soften the foam. Twin gas torches were used to soften polyethylene webbing 1/32 inch thick and delivered the burning gas at a temperature of 1000° F. The gas torch was fed with a mixture of natural gas and air to achieve this result. The cooled pressure rollers 22 were maintained at approximately 50° F. and exerted enough pressure to compress the foam body about 1/8 inch under the webbing. Under these conditions, excellent adhesion was obtained between the foam and webbing.

While certain representative embodiments and details have been shown for the purpose of illustrating the invention, it will be apparent to those skilled in the art that various changes and modifications can be made therein without departing from the spirit and scope of the invention.

Accordingly what is claimed as new is:

1. A method of laminating relatively thick plastic film to compatible plastic foam, said method comprising the steps of softening the foam through the application of heat prior to contact with the film, preheating the film such that only its outer surface is softened prior to contact with the foam, and pressing said film and said foam together.

2. A method of laminating relatively thick plastic film to compatible plastic foam, said method comprising the steps of softening the foam through the application of heat prior to contact with the film, preheating the film such that only its outer surface is softened prior to contact with the foam, immediately pressing said film and said foam together, and cooling the lamination substantially simultaneously with said pressing.

3. The method of claim 2 wherein said plastic film and foam comprise a polymer of ethylene.

4. A method of laminating relatively thick plastic film to compatible plastic foam, said method comprising the steps of applying a given quantity of heat to said foam on its laminating surface sufficient to soften that surface, applying a substantially greater quantity of heat to the laminating surface of said film sufficient to soften only that surface, the application of each quantity of heat taking place substantially simultaneously and on an area of said foam and film about to be laminated, and pressing said foam and film together to form the laminate.

5. A method of laminating traveling strips of a resinous foam body and a resinous film webbing, said method comprising the steps of continuously applying substantially by contact a given quantity of heat to progressing areas of the laminating surface of said foam body immediately prior to each areas lamination with said webbing, applying substantially by heated atmosphere a relatively greater quantity of heat to the progressing areas of the laminating surface of said webbing immediately prior to each areas lamination with said foam body such that only said surfaced is softened, directing said heated atmosphere so that it impinges on said webbing in the same general direction as the direction of travel of said webbing, pressing said foam body and webbing together, and cooling the lamination substantially simultaneously with said pressing.

6. An apparatus for laminating relatively thick plastic webbing to an elongated section of compatible plastic foam, said apparatus including a bed portion, cooled pressure roller means located opposite said bed portion along the length thereof, said bed portion and roller means spaced so as to receive said foam and webbing therebetween under pressure, means adjacent one end of said bed portion for continuously feeding said foam and said webbing into the apparatus so that they engage one another under the roller means, an electrically heated knife located opposite said bed portion and adapted to engage the webbing contacting surface of said foam prior to its entry under the roller means, second heat applicator means located opposite said bed portion and adapted to provide a heated atmoshpere with the foam contacting surface of said webbing prior to its entry under the roller means, and means adjacent the other end of said bed portion for continuously removing said laminated webbing and foam from under said roller means.

References Cited

UNITED STATES PATENTS

| | | | |
|---|---|---|---|
| 2,224,370 | 12/1940 | Wescott | 156—322 |
| 2,387,566 | 10/1945 | Custers | 156—322 |
| 2,728,703 | 12/1955 | Kiernan et al. | 156—322 |
| 2,861,022 | 11/1958 | Lundsager | 156—322 X |
| 3,057,766 | 10/1962 | Dickey | 156—322 |
| 3,062,698 | 11/1962 | Aykanian | 156—322 X |

ERAL M. BERGERT, *Primary Examiner.*

C. B. COSBY, *Assistant Examiner.*